United States Patent [19]

Juliussen

[11] 3,838,407

[45] Sept. 24, 1974

[54] BUBBLE MEMORY ORGANIZATION WITH TWO PORT MAJOR/MINOR LOOP TRANSFER

[75] Inventor: Jan Egil Juliussen, Richardson, Tex.

[73] Assignee: Texas Instruments Incorporated, Dallas, Tex.

[22] Filed: Dec. 28, 1973

[21] Appl. No.: 429,260

[52] U.S. Cl. .................... 340/174 TF, 340/174 SR
[51] Int. Cl. .................... G11c 11/14, G11c 19/00
[58] Field of Search ................ 340/174 TF, 174 SR

[56] References Cited

UNITED STATES PATENTS

| | | | |
|---|---|---|---|
| 3,613,056 | 10/1971 | Bobeck et al. | 340/174 TF |
| 3,680,067 | 7/1972 | Chow | 340/174 TF |
| 3,731,109 | 5/1973 | Garey | 340/174 TF |
| 3,737,882 | 6/1973 | Furuoya | 340/174 TF |
| 3,751,597 | 8/1973 | Bonyhard | 340/174 TF |
| 3,760,386 | 9/1973 | Quadri | 340/174 TF |

*Primary Examiner*—Stanley M. Urynowicz, Jr.
*Attorney, Agent, or Firm*—Harold Levine; Edward J. Connors, Jr.; William E. Hiller

[57] ABSTRACT

A magnetic bubble organization including a major loop which does not close on itself, but which does pass each of the minor loops in the same order to provide two locations in each minor loop for bubble transfer. Preferably, the two transfer locations on each minor loop are symmetrically located and the transfer mechanism can be one-way transfer gates. This permits transfer out of a minor loop into the major loop at one of the two gates for the minor loop and out of the major loop into the minor loop at the other of the two gates for the minor loop.

27 Claims, 6 Drawing Figures

BUBBLE MEMORY ORGANIZATION WITH TWO PORT MAJOR/MINOR LOOP TRANSFER

BACKGROUND OF THE INVENTION

1. FIELD OF THE INVENTION

This invention pertains to magnetic cylindrical (bubble) memory devices and more particularly to an arrangement of the magnetic domains of such devices to optimize operations consistent with attendant existing constraints on nucleation, propagation, detection and transfer.

2. DESCRIPTION OF THE PRIOR ART

Recently significant interest has developed in a class of magnetic devices known generically as "bubble" domain devices. Such devices described, for example, in IEEE Transactions on Magnetics, Vol. MAG. -5, No. 3 (1969) pp. 544–553, "Application of Orthoferrites to Domain-Wall Devices," are generally planar in configuration and are constructed of materials which have magnetically easy directions essentially perpendicular to the plane of the structure. Magnetic properties, e.g., magnetization anisotropy, coercivity, and mobility, are such that the device may be maintained magnetically with magnetization in a direction out of the plane and that single domain small localized regions of polarization aligned opposite to the general polarization direction may be supported. Such localized regions, which are generally cylindrical in configuration can represent digital information. Interest in devices of this nature is, in large part, based on their high density and the ability of the cylindrical magnetic domain to be independent of the boundary of the magnetic material in the plane in which it is formed and hence capable of moving anywhere in the plane of the magnetic material to effect various memory and logic functions.

The bubbles can be manipulated by programming currents through a pattern of conductors positioned adjacent the magnetic material or by varying the surrounding magnetic field. As an example, the magnetic domains or bubbles may be formed in thin platelets having uniaxial anisotropy with the easy magnetic axis perpendicular to the plate comprising such material as rare earth orthoferrites, rare earth aluminum and gallium substituted iron garnets or amorphous gadolinium cobalt. Since the magnetic bubbles can be propagated, erased, replicated, and manipulated to form logic operations and their presence and absence detected, these bubbles may be utilized to perform many of the on-off or digital functions vital to computer operation.

Magnetic bubble memory systems offer significant advantages since logic, memory, counting and switching may all be performed within a single layer of solid magnetic material. This is in contrast to conventional memory systems in which information must move from one device to another through interconnecting conductors, and high gain amplifiers. In addition, the actual magnetic material, such as magnetic tape, disc or drum, is mechanically transported past sensing and writing devices to effect data operations. In a magnetic bubble memory, however, these functions may all be effected within one continuous ferromagnetic medium and costly interfaces eliminated. The magnetic bubbles representing the data move in a plane of thin sheets of magnetic material such as magnetic garnet crystals, for example, and they can be shifted into precisely defined positions at high speed with little energy. The magnetic material itself remains stationary. With the advent of mixed rare earth aluminum or gallium substituted iron garnets which are capable of providing bit density in the order of $10^6$ per square inch, the development of a reliable solid state material memory equivalent of magnetic disc file or drums has become a particularly attractive and realistic concept.

Many organizations of operable domains have been disclosed. One of the most popular is a major-minor memory organization disclosed in U.S. Pat. No. 3,618,054 of P. I. Bonyhard, U., F. Gianola, and A. J. Perneski. The major-minor memory organization as well as its implementation and operation is now well known in the art. The major-minor loop organization as described in U.S. Pat. No. 3,618,054 and elsewhere includes a closed major loop. Typically, this closed loop is established by an arrangement of T-bar permalloy circuits on an orthoferrite or garnet crystal platelet. The bubbles circularly propagate around the loop by in-plane rotating magnetic field action. The major loop is generally elongated such as to allow a number of minor loops to be aligned alongside. Two-way transfer gates permit the transfer of bubbles from the minor loop to the major loop and from the major loop to a minor loop. Further access to the major loop is achieved by a detect and read connection thereto and by a separate write connection.

The organization permits a synchronized pattern of domains in the corresponding minor loops on separate platelets to represent a binary word. The propagation of domains in the loops is synchronous so as to permit parallel transfer of a selected word into the major loops of the platelets by the simple expedient of tracking the number of rotations of the in-plane field to determine the proper instant of transfer.

Several shortcomings may be observed, however. First, the information once transfered from the minor loops to a major loop must wait the full propagation cycle of the major loop before transfer is permitted back to the minor loop. Further, the transfer port or gate must be a two-way gate, which is inherently more complex than a one-way gate. Further, transferring in an out of the major loop at the same location requires reversing of the transfer sequence and results in more complex operation than for operation where all transfer steps and advancing steps are performed unidirectionally. Also, a bubble created by mistake for any reason and which gets into the major loop will circulate indefinitely since the major loop is a closed loop. Controller operations to track the position of the data in the circulating loops are also somewhat complex since the location of a bubble in the major loop with respect to its exit point from the minor loops must be tracked, as well as keeping up with the position of the data in the minor loops. Additionally the major-minor loop organization will not allow continuous data transfer because the data is transferred into and out of the minor loop by the same transfer gates.

It is therefore a feature of this invention to provide a major-minor loop magnetic domain organization that will allow a continuous data transfer.

It is another feature of this invention to provide an improved major-minor loop magnetic domain organization suitable for memory circuits such that the ingress and egress positions to the minor loops are at different locations, thereby simplifying or speeding up operations compared with prior art structures. The use of one-way transfer gates simplifies the transfer operations while two-way gates will decrease the memory access time.

It is a further feature of the present invention to provide an improved major-minor loop magnetic domain organization that makes possible the use of a simplified controller, due to the cyclic nature of all the control signals.

It is yet another feature of the present invention to provide an improved major-minor loop magnetic domain organization that eliminates the possible perpetuation of a spurious bubble.

SUMMARY OF THE INVENITON

A preferred embodiment of the present invention comprises a major-minor loop magnetic bubble organization, such as constructed on an epitaxial magnetic garnet platelet, in which the major loop does not close on itself. For convenience, the familiar "loop" terminology is used herein for characterizing the major domain path even though it does not close on itself. The path or track of the major loop passes adjacent the minor loops twice and in the same order. This permits bubbles to be transferred at a first location via one-way transfer gates from the minor loops and then subsequently back into the minor loops, again via one-way gates, at a second location. Alternatively, two-way gates can be employed at both locations, and read and write connections may be located near each transfer location for faster access of data to and from the minor loops. Spurious bubbles are not perpetually circulated, but are annihilated at the end of the major loop path. Controller operations are simplified since the position of the data in a minor loop adequately determines the position of the bubbles in the entire system at any one time, and because the control signals are cyclic.

It is possible also to have a double organization in which the major loop path passes by two rows of minor loops, in succession, in order that the path passes the first row of minor loops at a first location, the second row of minor loops at a first location, the first row of minor loops at a second location and the second row of minor loops at a second location.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings.

DESCRIPTION OF PREFERRED EMBODIMENTS

Figure 1:
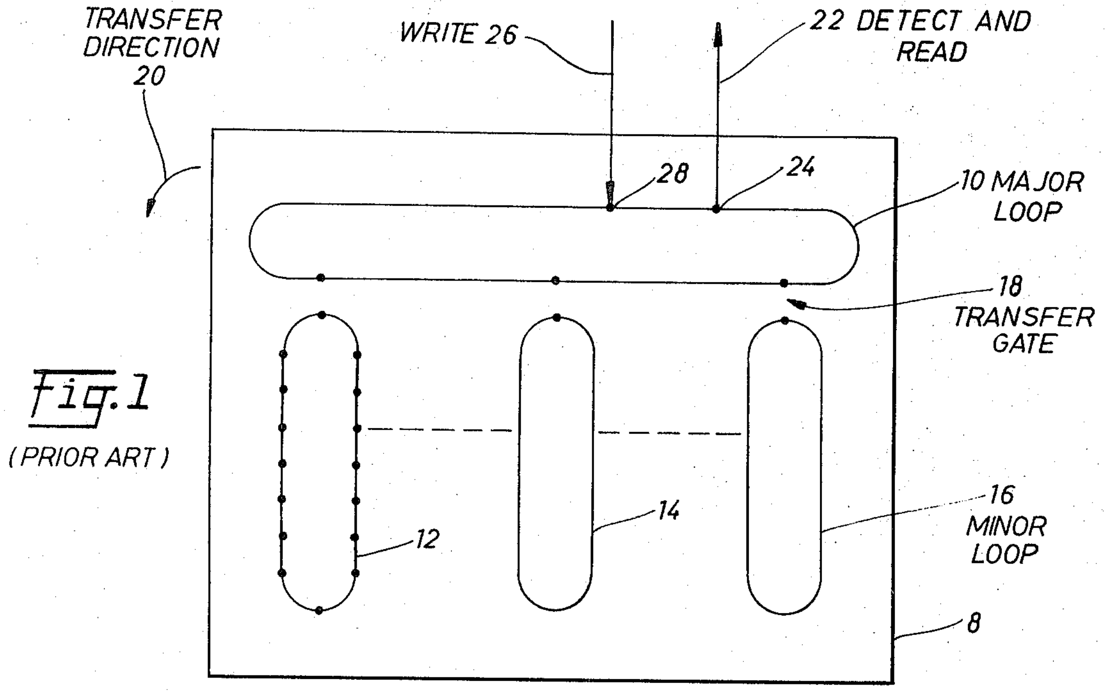
Fig.1 (PRIOR ART)
FIG. 1 is a plan view of a prior art major-minor loop bubble memory organization.

Now referring to the drawings, and first to FIG. 1, a prior art major-minor loop bubble memory organization is shown. This organization is similar to the one shown in U.S. Pat. Nos. 3,613,056; 3,618,054; and 3,729,726, among others. The conditions for establishing single wall magnetic domains on suitable material 8, such as an epitaxial magnetic garnet film on a nonmagnetic garnet substrate, are well known in the art. One article on the subject, which is hereby incorporated by reference, is the previously mentioned article appearing in IEEE Transactions on Magnetics, Vol. MAG. -5, No. 3 (1969), pp. 544–553. Patterns of magnetically soft overlay material (e.g., Permalloy) of bar and T-shaped segments are commonly employed to determine the loop patterns. One long loop identified as major loop 10, closes on itself, so that circulating bubbles established in the loop, in time, and provided that they are not transferred out, circulate indefinitely.

Aligned opposite the major loop 10, are a series of identical minor loops 12, 14 and 16. One portion (the nearest to major loop 10) of each minor loop acts as part of a two-way port or transfer gate 18 with the major loop. Transfer may be accomplished in the manner disclosed in the U.S. Pat. No. 3,618,054, also incorporated herein by reference. Although only three minor loops are specifically illustrated, the dotted lines between the minor loops indicate that additional minor loops may be established. A transfer pulse transfers one bubble (or the absence of a bubble) from each of the minor loops to the major loop simultaneously.

Once in the major loop, bubbles are propagated in transfer direction 20 by an in-plane rotating magnetic field, each rotation signifying four steps in the T-bar advancement sequence as described in U.S. Pat. No. 3,618,054. The bubble data sequence passing point 24 on the major loop, is replicated and read by the detector at point 22. If the write operation is specified, the bubble data is annihilated at point 24 and a generator at point 26 may write new data as desired, into the loop at point 28 located downstream from point 24.

Figure 2:
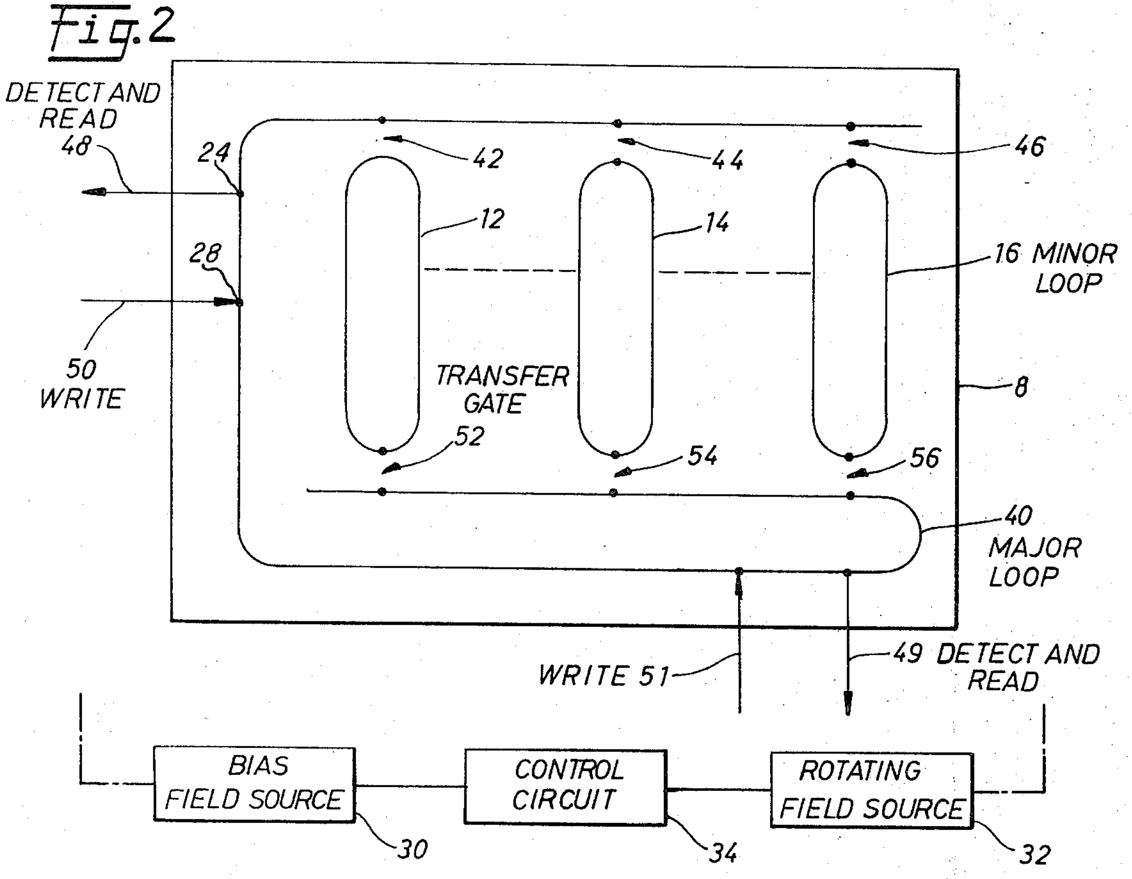
FIG. 2 is a plan view of a major-minor loop bubble memory organization in accordance with one embodiment of the present invention.

FIG. 2 shows a domain propagation arrangement in accordance with this invention. The arrangement comprises a layer 8 of magnetic material in which single wall domains can be supported and caused to be propagated, as discussed above with respect to the prior art organization. A bias field supplied by a source 30 maintains single wall domains in the material at nominal operating size, as is well know. Rotating field source 32 causes movement of a domains to occur, normally counterclockwise. Finally, source 32 is under the control of a control circuit 34 for activation and synchronization. Control circuit 34 also controls the transfer gates, replicate/annihilate, detect and generate functions.

The bias sources, control circuit and other auxiliary circuits (such as pulsing circuits for application to the transfer gates, counter circuits for tracking the bubbles in the loops, etc.) are well known. Although not specifically illustrated in each case, such circuits may be used with the embodiment shown in FIG. 2 and in FIGS. 3–6, as desired.

The organization illustrated in FIG. 2 includes a plurality of minor loops which may be considered identical to those shown in FIG. 1, and a major loop 40, generally of a "G" configuration. This organization is therefore called a "G-track." The major loop lies adjacent the minor loops on two sides thereof. At the top, the path of major loop 40 passes each of the minor loops at its uppermost point so that transfer gates 46, 44 and 42 connect loops 16, 14 and 12, respectively, to loop 40.

Assuming bubble propagation in major loop 40 at the top of the illustration from right to left, a bubble propagating in the major loop would first encounter the replicate/annihilate, then the detect and read connection 48 and then write connection 50, similar to the FIG. 1 arrangement.

At the bottom of the illustration, the major loop path doubles around so as to again lie adjacent minor loops 16, 14 and 12, respectively. A bubble propagating along major loop 40 will pass by the minor loops in the same order as they did on the upper segment of the major loop. In this case, transfer gates 56, 54 and 52 connect the minor loops with the major loops at the lowermost portion of the minor loops. It is preferable that the two transfer positions for each minor loop be symmetrically and diametrically opposite to one another so that the distance on the minor loop from its uppermost point to its lowermost point is the same length plus or minus one position in either direction. The minor loop will normally have an odd number of bubble positions. Hence the distance between the two ports will differ by one—i.e., the distance from 42 to 52 is X and distance from 52 to 42 is X-1 or vice versa.

In operation, the rotation magnetic field causes propagation in a counterclockwise direction in the minor loops. Then, on command from a transfer circuit, not shown, a transfer pulse is applied to the transfer gates. At that time, bubbles in the transfer gates 42, 44 and 46, are transferred from the respective minor loops to the major loops for subsequent propagation in the major loop. When the bubbles have traveled around the major loop until they are again in the bottom series of transfer gates, 52, 54 and 56, a pulse is again applied to these transfer gates. Such a transfer pulse transfers the data back into the minor loop at the lowest portions thereof. The bubble positions on the minor loops have rotated so that the data is transferred to its previous position.

It should be noticed that data may be transferred out of the minor loops into the major loop and out of the major loop and into the minor loops using one-way transfer gates. Further, the pulses to effect transfer operate the gates in the same manner each time and no travel of the bubbles in the reverse sense is required.

As previously discussed, one of the important features of the present invention is that it provides the use of one-way gates. However, the configuration is also advantageously employed with two-way gates when it is desired to extract and insert data more rapidly than is possible with the prior art FIG. 1 configuration. In this event, a second replicate/annihilate 53, detect and read connection 49 may be made, as shown in FIG. 2, and additional write connection 51 may also be made. These connections are made with respect to transfer gate 56 in the same relationship as the connections 48 and 50 are made with respect to gate 42. Therefore, if the direction of the in-plane rotating magnetic field is reversed from normal operation, data may be backed out of the minor loops at the transfer gates (this time two-way gates) so as to be detected and read at connection 49 and so as to permit insertion of new data at write connection 51.

Figure 3:
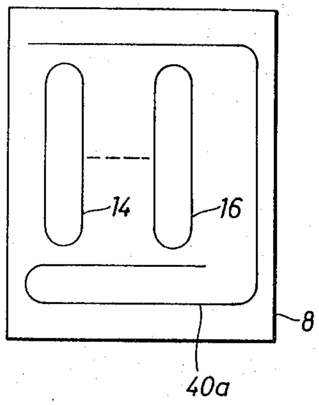
FIGS. 3–5 are plan views of alternate major-minor loop bubble memory organizations in accordance with the present invention.
Figure 4:
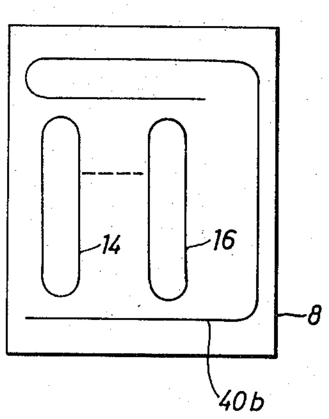
Figure 5:
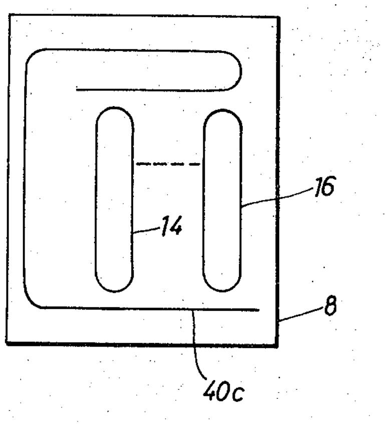

FIGS. 3, 4 and 5 illustrate additional embodiments of the invention. In each case there is a major-minor loop organization similar to that which is shown in FIG. 2. Whereas the major loop in FIG. 2 traced a "G" configuration beginning in the upper right hand corner, in the embodiment in FIG. 3, the path of major loop 40a traces a reverse "G" starting in the upper left hand corner. Circulation of bubbles in the loops propagate in a clockwise direction in this configuration with the application of an appropriate in-plane rotating magnetic field.

FIGS. 4 and 5 show major loops **40*b* and 40*c*, respectively. In each case the path of the loop may be considered to start at the bottom and trace a path which loops at the top. Major loop 40*b* starts at the lower left hand corner and major loop 40c starts at the lower right hand corner. Preferably, in-plane rotating magnetic fields would be counterclockwise in FIG. 4 to propagate bubbles on the major loop in the counterclockwise direction and would be clockwise in FIG. 5** to propagate bubbles on the major loop in the clockwise direction.

Figure 6:
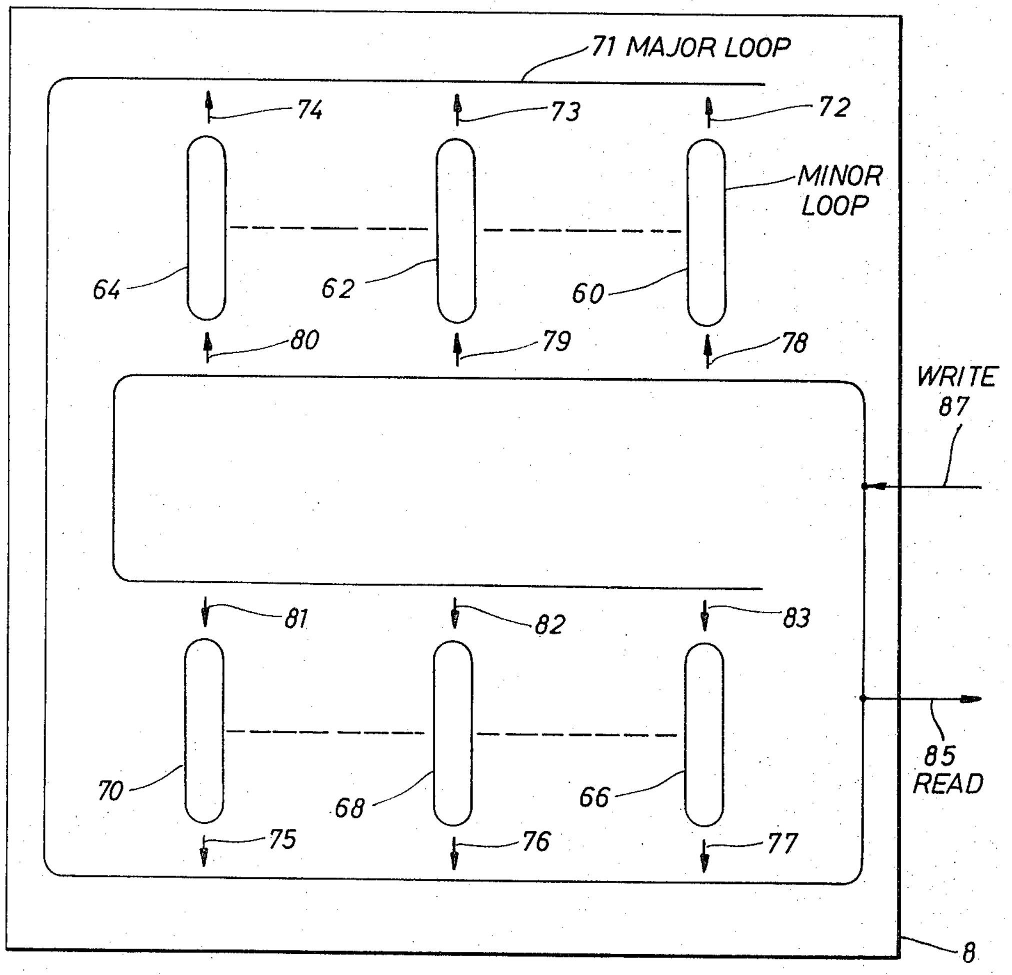
FIG. 6 is a plan view of an embodiment of a major-minor loop bubble memory organization in accordance with the present invention depicting two parallel rows of minor loops.

Now referring the FIG. 6, a double organization is illustrated. In this organization there are two, preferably parallel, rows of minor loops established in magnetic material 8. The top row of minor loops comprises loops 60, 62 and 64 (together with other loops in between as convenient to define the memory structure desired). Similarly, minor loops 66, 68 and 70, from right to left, define three of the minor loops comprising the bottom group.

In this case, major loop 71 defines what may be termed a "double G" configuration. Loop 71 may be considered to have a beginning in the upper right hand corner of the illustration. From there, it progresses, in turn, from right to left, past minor loop 60, minor loop 62, minor loop 64 adjacent their uppermost parts; then, from left to right, past minor loop 70, minor loop 68 and minor loop 66 adjacent their lowermost parts; then, from right to left, past minor loop 60, minor loop 62 and minor loop 64 adjacent their lowermost parts; and finally, from left to right, past minor loop 70, minor loop 68 and minor loop 66 adjacent their uppermost parts.

Notice that in this embodiment the major loop still passes by each of the minor loops in the same order on both passes, although the order is reversed for the two sets of loops. Further, if all of the minor loops in the organization are in the same memory sequence of elements, this order is permitted, since the major loop passes all of the minor loops in both groups once before it encounters the minor loops in the first group a second time.

As before with the embodiments shown in FIGS. 2–5, one-way transfer gates may be used at each of the uppermost and lowermost parts of the minor loops for transferring bubbles. The arrows shown at ports or transfer gates 72–83 are drawn in the direction of the one-way transfer under normal operation.

Note that read connections 85 and write connection 87 are positioned with respect to the major loop after the major loop has passed all of the minor loops once but before it passes even the first minor loop a second time. Again this is functionally similar to the embodiment described above for FIG. 2.

The "double G" organization which is shown in FIG. 6 may be reorganized in any of four patterns similar to those shown for FIGS. 3–5 with respect to FIG. 2.

While particular embodiments of the invention have been shown, it will be understood that the invention is not limited thereto, since many modifications may be made and will become apparent to those skilled in the art.

What is claimed is:

1. A magnetic memory comprising in combination:

a non-magnetic substrate, a body of magnetic material capable of supporting magnetic domains secured adjacent one surface of said substrate, said magnetic domains being organized into a non-closed major loop and a plurality of minor loops suitably positioned for transfer of domains, said major loop path lying adjacent said minor loops along two sides thereof, such that a domain traveling on said major loop without transfer twice passes the minor loops in the same order, and means coupled to said body for generating and controllably positioning magnetic domains in said magnetic material.

2. A magnetic memory as set forth in claim 1, wherein said magnetic material is an orthoferrite platelet.

3. A magnetic memory as set forth in claim 1, wherein said magnetic material is a single crystal magnetic garnet platelet.

4. A magnetic memory as set forth in claim 1, wherein said magentic material comprises a film of mangetic garnet disposed on a non-magnetic garnet substrate.

5. A magnetic memory as set forth in claim 1, wherein said magnetic material is an amorphous gadolinium cobalt thin film.

6. A magnetic memory as set forth in claim 1, wherein said means for generating and controllably positioning magnetic domains includes T-bar permalloy circuits.

7. A magnetic memory as set forth in claim 1, wherein said means for generating and controllably positioning magnetic domains includes Y-bar permalloy circuits.

8. A magnetic memory as set forth in claim 1, wherein said means for generating and controllably positioning magnetic domains includes chevron permalloy circuits.

9. A magnetic memory as set forth in claim 1, wherein said means for generating and controllably positioning magnetic domains includes X-bar permalloy circuits.

10. A magnetic memory as set forth in claim 1, wherein the path of said major loop passes correspondingly with respect to each of said minor loops.

11. A magnetic memory as set forth in claim 1, wherein the path of said major loop passes for domain transfer each of said minor loops at symmetrical locations thereof.

12. A magnetic memory as set forth in claim 1, and including one-way transfer gates between said major loop and said minor loops.

13. A magnetic memory as set forth in claim 1, and including two-way transfer gates between said major loop and said minor loops.

14. A magnetic memory comprising in combination:

a non-magnetic substrate, a body of material capable of supporting magnetic domains secured adjacent one surface of said substrate, said magnetic domains being organized into a non-closed major loop and first and second pluralities of said minor loops suitably positioned for transfer of domains, said major loop path lying adjacent said first and second pluralities of minor loops along two sides thereof such that a domain traveling on said major loop without transfer passes said first plurality of minor loops along the first side thereof in a first order, said second plurality of minor loops along the first side thereof in a second order, said first plurality of minor loops along the second side thereof in said first order, and said second plurality of minor loops along the second side thereof in said second order, and means coupled to said body for generating and controllably positioning magnetic domains in said magnetic material.

15. A magnetic memory as set forth in claim 14, wherein said first and second pluralities of minor loops are geometrically aligned in parallel rows.

16. A magnetic memory as set forth in claim 14, wherein said magnetic material is an orthoferrite platelet.

17. A magnetic memory as set forth in claim 14, wherein said magnetic material is a single crystal magnetic garnet paltelet.

18. A magnetic memory as set forth in claim 14, wherein said magnetic material comprises a film of magnetic garnet disposed on a non-magnetic garnet substrate.

19. A magnetic memory as set forth in claim 14, wherein said magnetic material is an amorphous gadolinium cobalt thin film.

20. A magnetic memory as set forth in claim 14, wherein said means for generating and controllably positioning magnetic domains includes T-bar permalloy circuits.

21. A magnetic memory as set forth in claim 14, wherein said means for generating and controllably positioning magnetic domains includes Y-bar permalloy circuits.

22. A magnetic memory as set forth in claim 14, wherein said means for generating and controllably positioning magnetic domains includes chevron permalloy circuits.

23. A magnetic memory as set forth in claim 14, wherein said means for generating and controllably positioning magnetic domains includes X-bar permalloy circuits.

24. A magnetic memory as set forth in claim 14, wherein the path of said major loop passes correspondingly with respect to each of said minor loops.

25. A magnetic memory as set forth in claim 14, wherein the path of said major loop passes for domain transfer each of said minor loops at symmetrical locations thereof.

26. A magnetic memory as set forth in claim 14, and including one-way transfer gates between said major loop and said minor loops.

27. A magnetic memory as set forth in claim 14, and including two-way transfer gates between said major loop and said minor loops.

* * * * *